Patented Oct. 3, 1944

UNITED STATES PATENT OFFICE 2,359,688

HYDRAZIDES OF DIHYDRO LYSERGIC ACID AND DIHYDRO ISOLYSERGIC ACID AND A PROCESS FOR THEIR MANUFACTURE

Arthur Stoll and Albert Hofmann, Basel, Switzerland, assignors to Sandoz Ltd., Fribourg, Switzerland, a corporation of Switzerland No Drawing. Application May 4, 1942, Serial No. 441,754. In Switzerland May 13, 1941

9 Claims. (Cl. 260—236)

The present invention relates to hydrazides of dihydro lysergic and dihydro isolysergic acids which are valuable products for the manufacture of alkaloids of the ergot type and to a process for their manufacture.

It is known that the natural ergot alkaloids on treatment with hydrazine or hydrazine hydrate become split, whereby as a component of all ergot alkaloids the lysergic acid can be isolated in form of racemic isolysergic hydrazide (see U. S. Patent No. 2,090,429). This racemic isolysergic acid hydrazide is a suitable starting product, for example, for the synthesis of ergobasine, the highly uteroactive natural ergot alkaloid, and of its homologues and derivatives as well as for the synthesis of other acid amides of lysergic acid (see U. S. Patent No. 2,090,430).

The high-active natural ergot alkaloids like ergotamine, ergotoxine, ergobasine are derivatives of d-lysergic acid. By their transformation into the isolysergic acid form, i. e. into ergotaminine, ergotinine, ergobasinine, there results a strong decrease of their physiological activity. Practically inactive are also the derivatives of the l-lysergic acid which is not found in the nature and which represents the optical antipode of, for instance, the natural ergobasine (see A. Stoll & A. Hofmann, Hoppe-Seyler's Zeitschrift für physiolog. Chemie 251, 163 [1938]). As the lysergic acid hydrazides are prepared to be used for the synthesis of the highly active ergot alkaloids, the isomerization and racemisation of the lysergic acid molecule taking place during the treatment with hydrazine, present an important draw-back. Thus, for instance, by starting from racemic isolysergic acid hydrazide, it will be necessary, before making the synthesis of the alkaloid, to subject it to optical splitting into the active d-lysergic acid and into the inactive l-lysergic acid, or into the isolysergic acid derivative, and thereupon to subject it to a transformation from the isolysergic acid series into the lysergic acid series. All these operations decrease the yield of the desired product, owing to the fact that all of these compounds are very sensitive to the various chemical operations.

It has now been found that the isomerization and the racemisation of the lysergic acid group during the treatment with hydrazine can be avoided, when, instead of using the natural alkaloids of the ergot, their dihydro derivatives (see U. S. A. application Ser. No. 395,198) are subjected to the hydrazine treatment. During the treatment of the dihydro alkaloids of the lysergic acid series, like dihydroergotamine or dihydroergosine, with hydrazine a homogeneous optically active dihydro lysergic acid will be obtained, while from the dihydro alkaloids of the isolysergic acid series, like dihydroergotaminine or dihydroergosinine, a homogeneous optically active dihydro isolysergic acid hydrazide is obtained; by using as starting material dihydro lysergic- or isolysergic acid esters respectively, the same result will be reached.

Besides the aforesaid advantage consisting in that during the hydrazine treatment no racemisation and isomerization takes place, a further advantage will be obtained insofar as the yield of hydrazide increases to 90 to 100% when hydrogenated alkaloids are used, instead of a yield of only 70–80% when natural alkaloids are subjected to the treatment. The treatment of dihydro derivatives of the lysergic acid with hydrazine or hydrazine hydrate is carried out by dissolving the starting material in hydrazine or hydrazine hydrate and boiling the solution during e. g. 1 hour at a reflux condenser. It is also possible to work at a lower temperature, for instance at 50° C. or under pressure but preferably at a higher temperature, for instance, at 150° C. According to the method used the time of the reaction can be longer or shorter. Sometimes it is advantageous to work in presence of a suitable solvent such as butanol, pyridine and the like and in an inert atmosphere, such as in nitrogen.

The dihydro lysergic acid hydrazide prepared according to the present invention for example from dihydro ergotamine or another dihydro alkaloid of the physiologically active series, or from α-dihydro lysergic acid ester (see W. A. Jacobs and L. C. Craig, Journ. Biol. Chem. 115, 227 [1936]) possesses the following properties. It is very difficultly soluble in chloroform, ether and benzene, rather difficultly soluble in hot water, easily soluble in warm methanol and ethanol. The new compound is also very easily soluble in dilute aqueous organic and inorganic acids. From a hot saturated solution in methanol the dihydro lysergic acid hydrazide crystallises out in centimeter-long smooth white needles melting under decomposition at 247° C. (corr.).

The elementary analysis of the compound dried in high vacuo at 100° C. has given the following values:

C 67.54; 67.25%; H 7.54; 7.27%; N 19.66; 19.67%

For $C_{16}H_{20}ON_4$ the calculated values are:

C 67.56%; H 7.09%; N 19.72%

The optical rotation has been found to be $[\alpha]^{20}_D = -124°$ ($c = 0.4$ in pyridine).

The typical color reactions of the ergot substances are also given by the dihydro lysergic acid hydrazide in the same strength.

An alcoholic solution of the hydrazide containing 1% of p-dimethylaminobenzaldehyde yields, by underlaying with concentrated sulfuric acid, a beautiful violet zone (reaction of Van Urk).

A small quantity of the substance dissolved in glacial acetic acid containing some iron chloride produces with concentrated sulfuric acid a beautiful blue coloration (reaction of Keller). The blue coloration given by the dihydro lysergic acid hydrazide is somewhat redder as compared to that given by the non-hydrogenated lysergic acids or lysergic acid derivatives.

The dihydro isolysergic acid hydrazide obtained from the dihydro alkaloids of the isolysergic acid series like dihydro ergotaminine or from dihydro isolysergic acid ester ($\gamma$-dihydro isolysergic acid methylester of Jacobs & Craig, l. c.) possesses similar solubility as the dihydro lysergic acid hydrazide. From concentrated solution in methanol the new compound crystallizes out in long smooth white needles melting under decomposition at 260° C. (corr.). The elementary analysis of the compound dried in high vacuo at 100° C. has given the following values:

C. 67.41; 67.60%; H 7.38; 7.60%; N 19.71; 19.59%

For $C_{16}H_{20}ON_4$ the calculated values are:

C 67.56%; H 7.09%; N 19.72%

The specific optical rotation has been found to be $[\alpha]^{20}_D = +56°$ ($c=0.6$ in pyridine).

The characteristic color reactions of the ergot compounds remain the same for the dihydro isolysergic acid hydrazide, as for the dihydro lysergic acid hydrazide.

The new compounds prepared by the present process are valuable starting products for the manufacture of amides and esters of the type of ergot alkaloids.

The following examples, without being limitative, describe the present invention; the parts being by weight:

Example 1

1 part of dihydro ergotamine (containing crystalacetone-water) is dissolved in 3 parts of anhydrous hydrazine and heated at a reflux condenser to boiling. A clear yellowish solution will be obtained very rapidly when heating at about 113° C. After boiling for 1 hour the solution is diluted with 1.7 parts of water in order to convert the hydrazine into hydrazine hydrate, in which dihydro lysergic acid hydrazide is very difficultly soluble. Therefore the new compound begins to crystallise out in form of colorless needles and, after a very short time, the whole reaction mass becomes transformed into a paste of crystals. After a short standing the crystals are filtered, washed with water and dried in vacuo over calcium chloride.

Yield: 0.38 part of pure dihydro lysergic acid hydrazide or 98% of the theory.

The compound thus obtained possesses the properties cited above.

Example 2

1 part of dihydro ergosine is heated during 1 hour at reflux with 10 parts of hydrazine hydrate. Already after a few minutes all of the substance goes into solution. By cooling down the reaction mixture, the dihydro lysergic acid hydrazide crystallises out in form of colorless needles. After standing for several hours in a cool place the crystals are filtered and washed with water. By concentrating the mother-liquor to about 3 parts, further small amounts of hydrazide can be obtained.

Total yield: 0.48 part=93% of the theory of pure dihydro lysergic acid hydrazide.

Example 3

1 part of dihydro lysergic acid methylester (identical with $\alpha$-dihydro lysergic acid methylester of Jacobs & Craig l. c.) is dissolved in 4 parts of anhydrous hydrazine and heated during 12 hours at 50° C. By diluting the solution with 2.3 parts of water, the dihydro lysergic acid hydrazide crystallizes out in pure form.

Yield: 0.94 part=94% of the theory.

Example 4

1 part of dihydro ergotaminine is dissolved in 2 parts of anhydrous hydrazine and heated during 1 hour to boiling at a reflux condenser. The clear yellow solution is diluted still warm with 1.1 parts of water, whereby the dihydroisolysergic acid hydrazide begins immediately to crystallize out in form of colorless needles. The crystals are filtered off and washed with water. Yield: 0.45 part=93% of the theory. This compound possesses the properties described above.

Example 5

1 part of dihydro ergotinine is introduced, together with 4 parts of hydrazine hydrate, into a glass tube which is then hermetically sealed, and heated in an oil bath during ½ hour at 150° C. On cooling down the reaction solution becomes converted into a crystal paste which, after diluting with water, is filtered. Yield: 0.44 part of pure dihydro isolysergic acid hydrazide or 95% of the theory.

Example 6

1 part of dihydro isolysergic acid methylester (identical with $\gamma$-dihydrolysergic acid methylester of Jacobs & Craig, l. c.) is dissolved in 3 parts of butanol and, after addition of 1 part of hydrazine hydrate, the whole is boiled under reflux and in a nitrogen atmosphere during 3 hours. The solution is then evaporated in vacuo to about half its volume, whereby a thick crystal paste is obtained. The crystals are filtered and washed with water. Yield: 0.92 part of pure dihydro isolysergic acid hydrazide=92% of the theory.

What we claim is:

1. A process for the manufacture of a hydrazide of a dihydro lysergic acid, comprising the step of heating a dihydro compound selected from the class consisting of amides and esters of lysergic and isolysergic acids with hydrazine.

2. A process for the manufacture of a hydrazide of a dihydro lysergic acid, comprising the step of heating at a temperature of 50°–150° C. a dihydro compound selected from the class consisting of amides and esters of lysergic and isolysergic acids with hydrazine.

3. A process for the manufacture of a hydrazide of a dihydro lysergic acid, comprising the step of heating at a temperature of 50°–150° C. and in the presence of an organic solvent and in an inert atmosphere a dihydro compound selected from the class consisting of amides and esters of lysergic and isolysergic acids with hydrazine.

4. A process for the manufacture of dihydro lysergic acid hydrazide, comprising the step of heating dihydroergotamine with hydrazine to about 113° C.

5. A process for the manufacture of dihydro lysergic acid hydrazide, comprising the step of heating dihydro lysergic acid methylester with hydrazine to about 113° C.

6. A process for the manufacture of dihydro isolysergic acid hydrazide, comprising the step of heating dihydro ergotamine with hydrazine to about 113° C.

7. A hydrazide of a dihydro lysergic acid which is contained in the ergot alkaloids, which hydrazide possesses the general formula $C_{16}H_{20}ON_4$, which is a white crystallised compound giving the typical color reactions of the ergot alkaloids and which is difficultly soluble in chloroform, ether and benzene, but easily soluble in warm methanol and ethanol, prepared for use as an intermediate for the preparation of a therapeutically active compound of the type of the ergot alkaloids.

8. The dihydro lysergic acid hydrazide corresponding to the general formula $C_{16}H_{20}ON_4$, which is a white crystallised compound melting under decomposition at 247° C., whose optical rotation is $[\alpha]^{20}_D = -124°$ ($c=0.4$ in pyridine), which gives the typical color reactions of the ergot alkaloids and which is difficultly soluble in chloroform, ether and benzene, but easily soluble in warm methanol and ethanol, prepared for use as an intermediate for the preparation of a therapeutically active compound of the type of the ergot alkaloids.

9. The dihydro isolysergic acid hydrazide corresponding to the general formula $C_{16}H_{20}ON_4$, which is a white crystallised compound melting under decomposition at 260° C., whose optical rotation is $[\alpha]^{20}_D = +56°$ ($c=0.6$ in pyridine), which gives the typical color reactions of the ergot alkaloids and which is difficultly soluble in chloroform, ether and benzene, but easily soluble in warm methanol and ethanol, prepared for use as an intermediate for the preparation of a therapeutically active compound of the type of the ergot alkaloids.

ARTHUR STOLL.
ALBERT HOFMANN.